United States Patent
Laferte et al.

(10) Patent No.: US 9,518,202 B2
(45) Date of Patent: Dec. 13, 2016

(54) SELF-ADHESIVE OF RENEWABLE ORIGIN WITH TEMPERATURE-STABLE ADHESIVE POWER

(71) Applicant: BOSTIK S.A., La Plaine St Denis (FR)

(72) Inventors: Olivier Laferte, Trosly Breuil (FR); Stéphane Fouquay, Mont Saint Aignan (FR)

(73) Assignee: BOSTIK S.A., La Plaine St Denis (FR)

( * ) Notice: Subject to any disclaimer, the term of this patent is extended or adjusted under 35 U.S.C. 154(b) by 0 days.

(21) Appl. No.: 14/522,880

(22) Filed: Oct. 24, 2014

(65) Prior Publication Data
US 2015/0118490 A1    Apr. 30, 2015

(30) Foreign Application Priority Data
Oct. 24, 2013   (FR) .................................. 13 60358

(51) Int. Cl.
| | |
|---|---|
| C09J 175/04 | (2006.01) |
| C09J 175/06 | (2006.01) |
| C09J 7/02 | (2006.01) |
| C08G 18/75 | (2006.01) |
| C08G 18/10 | (2006.01) |
| C08G 18/22 | (2006.01) |
| C08G 65/336 | (2006.01) |
| C08G 18/42 | (2006.01) |
| C09J 171/00 | (2006.01) |
| C09J 193/04 | (2006.01) |

(52) U.S. Cl.
CPC .............. *C09J 175/06* (2013.01); *C08G 18/10* (2013.01); *C08G 18/227* (2013.01); *C08G 18/4233* (2013.01); *C08G 18/755* (2013.01); *C08G 65/336* (2013.01); *C09J 7/02* (2013.01); *C09J 7/0203* (2013.01); *C09J 7/0207* (2013.01); *C09J 171/00* (2013.01); *C09J 175/04* (2013.01); *C09J 193/04* (2013.01); *C08G 2170/20* (2013.01); *C08G 2170/40* (2013.01); *C09J 2203/334* (2013.01); *C09J 2471/00* (2013.01); *C09J 2475/00* (2013.01); *Y10T 428/2896* (2015.01)

(58) Field of Classification Search
CPC ....... C09J 7/0203; C09J 175/04; C09J 175/06; C09D 175/04; C09D 175/08; C08G 18/4233; C08G 18/42
See application file for complete search history.

(56) References Cited

U.S. PATENT DOCUMENTS

| | | |
|---|---|---|
| 8,535,798 B2 | 9/2013 | Poivet et al. |
| 8,642,708 B2 | 2/2014 | Stanjek et al. |
| 8,691,909 B2 | 4/2014 | Laferte et al. |
| 2011/0052912 A1 | 3/2011 | Poivet et al. |
| 2011/0151253 A1 | 6/2011 | Laferte et al. |
| 2012/0298300 A1* | 11/2012 | Oertli ..................... C08G 18/10 156/329 |
| 2013/0102738 A1 | 4/2013 | Stanjek et al. |

FOREIGN PATENT DOCUMENTS

| | | |
|---|---|---|
| DE | 102010030096 A1 | 12/2011 |
| EP | 2336208 A1 | 6/2011 |
| WO | 2009/106699 A2 | 9/2009 |

OTHER PUBLICATIONS

Search Report dated Feb. 11, 2014 issued in corresponding French Application 1360358 (pp. 1-2).

* cited by examiner

*Primary Examiner* — Michael L Leonard
(74) *Attorney, Agent, or Firm* — Millen, White, Zelano and Branigan, P.C.

(57) ABSTRACT

Heat-curable adhesive composition:
  47-60% of polyether/polyurethane bearing alkoxysilane end groups and polyurethanes bearing alkoxysilane end groups of formula (II):

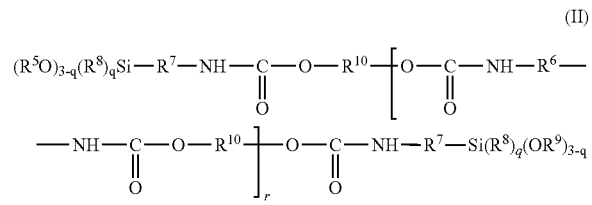

in which: $R^6$ is a divalent C5-C15 hydrocarbon-based radical; $R^7$ is a divalent C1-C3 alkylene radical; $R^8$ and $R^9$ are a C1-C4 alkyl; q is 0, 1 or 2; r is such that the number-average molar mass of the polymers of formula (II) is between 900 Da and 11 kDa; $R^{10}$ is a divalent polyester block with a hydroxyl number $I_{OH}$ of between 40 and 60 mg KOH/g;
  37-50% of a compatible tackifying resin; and
  0.01-3% of a crosslinking catalyst.

18 Claims, No Drawings

SELF-ADHESIVE OF RENEWABLE ORIGIN WITH TEMPERATURE-STABLE ADHESIVE POWER

The present invention relates to a heat-curable adhesive composition comprising polymers bearing hydrolysable alkoxysilane end groups, which may be obtained, at least partly, from starting materials of renewable origin. This composition makes it possible, after coating, to obtain a self-adhesive support whose adhesive power is maintained over a wide temperature range. The invention also relates to the said self-adhesive support, and also to its use for manufacturing self-adhesive labels and/or tapes.

Patent applications WO 09/106 699 and EP 2 336 208 have already disclosed adhesive compositions based on polyurethane (or polyether) bearing hydrolysable alkoxysilane end groups, the coating of which onto a support and heating lead, after a chemical crosslinking reaction performed in the presence of atmospheric moisture, to the production of a self-adhesive support which has advantageous properties of adhesive power and of immediate tack power. As a result of these properties, the said self-adhesive support may be used for manufacturing self-adhesive labels and/or tapes.

The adhesive seal that fixes the said self-adhesive support onto a substrate is thus formed by this crosslinking reaction. As a result, it covers a three-dimensional polymeric network structure comprising siloxane bonds and also has the advantage of conserving the required adhesive power over a wide temperature range. This makes it possible to envisage the use of the said self-adhesive support in any application in which an article coated with the label and/or tape is exposed to very variable temperatures, including those very far from room temperature. Examples that may be mentioned include the placing of labels onto certain parts of motor vehicles (or other vehicles) located close to the engine, or onto wrappings designed to receive during their packaging a hot liquid, or alternatively onto articles (such as tyres) that are labelled while hot, on leaving the manufacturing lines. Mention may also be made of the use of self-adhesive tapes for assembling parts for which good heat resistance is necessary, as in the case, for example, of the interior trim of aircraft or other vehicles.

The composition disclosed by patent application WO 09/106 699 comprises from 20% to 85% of a polyurethane with two hydrolysable alkoxysilane end groups, the production process of which comprises the reaction of a diisocyanate with a polyether diol, more particularly a polyoxyalkylene diol, such as polypropylene glycol.

However, polyoxyalkylene diols are manufactured by polymerization of alkylene oxides, which are themselves obtained solely from starting materials of non-renewable origin, especially from ethylene and propylene derived from the vapour cracking of naphtha or natural gas.

The composition disclosed by patent application EP 2 336 208, which comprises from 20% to 85% of a polyether with two hydrolysable alkoxysilane end groups, is also obtained from a polyoxyalkylene diol and thus has the same drawback as the composition disclosed by patent application WO 09/106 699.

Now, in the current context of the development of "green" chemistry for manufacturing adhesive compositions, it is increasingly sought to avoid the use of non-renewable starting materials (of petroleum or fossil origin), or at the very least to reduce their weight proportion in the said compositions. It is thus rather sought to use, for the manufacture of the said compositions, renewable starting materials, of plant or animal origin.

The aim of the invention is to propose heat-curable adhesive compositions which offer properties similar to those of the compositions known from the prior art, while at the same time replacing, at least partly, the polymers bearing hydrolysable alkoxysilane end groups used in the said compositions, with polymers bearing hydrolysable alkoxysilane end groups that may be manufactured from renewable starting materials.

The subject of the present invention is thus, firstly, a heat-curable adhesive composition comprising:

(α) from 47% to 60% weight/weight of a composition (A) comprising polymers bearing hydrolysable alkoxysilane end groups, the said composition (A) consisting of:

from 10% to 50% weight/weight of a polymer (A1) of formula (I):

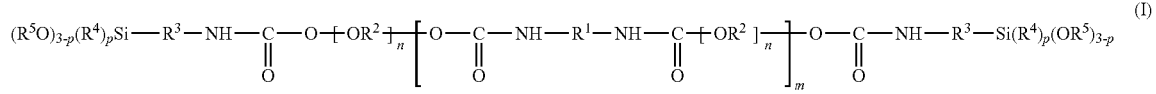

in which:
R$^1$ represents a divalent hydrocarbon-based radical comprising from 5 to 15 carbon atoms, which may be aromatic or aliphatic, and linear, branched or cyclic;
R$^2$ represents a linear or branched divalent alkylene radical comprising from 1 to 4 carbon atoms;
R$^3$ represents a linear divalent alkylene radical comprising from 1 to 3 carbon atoms;
R$^4$ and R$^5$, which may be identical or different, each represent a linear or branched alkyl radical of 1 to 4 carbon atoms, with the possibility, when there are several radicals R$^4$ (or R$^5$), of them being identical or different;
n is an integer such that the number-average molar mass of the polyether block of formula —[OR$^2$]$_n$— is between 300 Da and 30 kDa;
m is either equal to 0 or a non-zero integer such that the number-average molar mass of the polymer of formula (I) is between 600 Da and 60 kDa;
p is an integer equal to 0, 1 or 2; and
from 50% to 90% weight/weight of a composition (A2) comprising at least 85% weight/weight of polyurethanes bearing hydrolysable alkoxysilane end groups of formula (II):

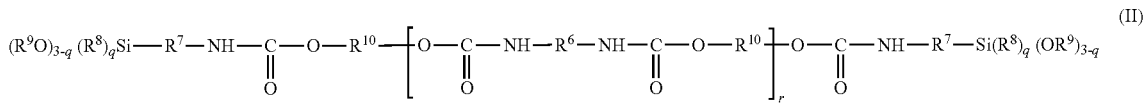

in which:
R⁶ represents a divalent hydrocarbon-based radical comprising from 5 to 15 carbon atoms, which may be aromatic or aliphatic, and linear, branched or cyclic;
R⁷ represents a linear divalent alkylene radical comprising from 1 to 3 carbon atoms;
R⁸ and R⁹, which may be identical or different, each represent a linear or branched alkyl radical of 1 to 4 carbon atoms, with the possibility, when there are several radicals R⁸ (or R⁹), of them being identical or different;
q is an integer equal to 0, 1 or 2;
r is a number such that the number-average molar mass of the polymers of formula (II) is between 900 Da and 11 kDa;
R¹⁰ represents a divalent polyester block of formula (III):

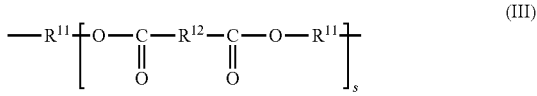

in which:
R¹¹ represents a divalent hydrocarbon-based radical which is derived from a dimerized fatty alcohol by replacement of each of the two hydroxyl groups with a free valency, the said alcohol having a hydroxyl number $I_{OH}$ of between 200 and 220 mg KOH/g;
R¹² represents a divalent hydrocarbon-based radical which is derived from a dimerized fatty acid by replacement of each of the two carboxyl groups —COOH with a free valency, the said acid having an acid number $I_A$ of between 190 and 200 mg KOH/g;
s is a number such that the polyester diol of formula IV:

has a hydroxyl number $I_{OH}$ of between 40 and 60 mg KOH/g;
(β) from 37% to 50% weight/weight of a compatible tackifying resin (B) with a number-average molar mass of between 200 Da and 10 kDa; and
(γ) from 0.01% to 3% weight/weight of a crosslinking catalyst (C).

The adhesive composition according to the invention may, very advantageously, be prepared from starting materials, some of which, especially the dimerized fatty acids or the dimerized fatty alcohols used for the manufacture of composition (A2), are of natural and renewable origin. Furthermore, the said adhesive composition leads, after coating onto a support and curing, to the formation of a self-adhesive support which has adhesive and tack power properties of the same level as those obtained with the adhesive compositions taught by patent applications WO 09/106 699 and EP 2 336 208.

In the present text:
the number-average molar masses indicated for the polymers are determined by gel permeation chromatography in THF (or GPC, also known as size exclusion chromatography or SEC), with calibration relative to a polystyrene standard of certified external molecular weight;
the Brookfield viscosities indicated are measured according to standard DIN ISO 2555 with a Brookfield RTV viscometer, optionally equipped (depending on the measuring temperature) with a Thermosel system.

1. Composition (A):
The radicals and groups defined previously in the general formulae (I), (II), (III) and (IV) keep the same meaning in the present description, unless otherwise indicated.
Composition (A) consists, for 10% to 50% weight/weight, of the polymer (A1) of formula (I).

1.1. Polymer (A1) of Formula (I):
According to a first embodiment, polymer (A1) is a polyether, corresponding to formula (I) in which m equals 0. This embodiment is most particularly preferred.
According to a second embodiment, polymer (A1) is a polyurethane, corresponding to formula (I) in which m is other than 0, and preferably m is less than or equal to 10.
According to a further preferred variant of these two embodiments, the polymer(s) (A1) of formula (I) have one and/or other of the following characteristics:
R⁴ and R⁵, which may be identical or different, each represent a methyl or ethyl radical;
R² is chosen from the following divalent radicals: ethylene, isopropylene, n-propylene, n-butylene, ethylethylene.
According to an even further preferred variant of these two modes, the polymer(s) (A1) of formula (I) are such that:
p=0 or 1;
R⁴ and R⁵ each represent a methyl radical; and
R² is an alkylene radical containing 3 carbon atoms.
According to another preferred variant, the polyether (A1) of formula (I) is such that its number-average molar mass ranges from 30 to 40 kDa and its viscosity, measured at 23° C., ranges from 30 to 37 Pa·s.
According to a variant that is also advantageous, the polyether (A1) of formula (I) has a polydispersity index ranging from 1 to 2. The polydispersity index is the ratio of the weight-average molecular mass to the number-average molecular mass. In this case, the polyether (A1) of formula (I) may be prepared from a polyether diol of formula H—[OR²]ₙ—OH which itself has a polydispersity index ranging from 1 to 2. The latter polyether diol may be obtained, in a known manner, by polymerization of the corresponding alkylene oxide in the presence of a catalyst based on a metal cyanide double complex. Corresponding commercial products are also available under the name Acclaim® from the company Bayer.
Polymer (A1) of formula (I) is prepared via the process described in patent application EP 2 336 208 or WO 2009/106 699 depending on whether it is, respectively, a polyether (in the case where m equals 0) or a polyurethane (in the case where m represents a non-zero integer).
Composition (A) also consists, for 50% to 90% weight/weight, of a composition (A2) of polymers bearing hydrolysable alkoxysilane end groups.

1.2. Composition (A2) of Polymers of Formula (II):

Composition (A2) of polyurethanes bearing alkoxysilane end groups of formula (II) is prepared according to a process in three sequential steps.

1st Step

Preparation of a Composition (A2-1) with a Hydroxyl Number $I_{OH}$ of Between 40 and 60 mg KOH/g and Comprising at Least 85% Weight/Weight of Polyester Diols of Formula (IV)

In this first step, the following are reacted via a polycondensation reaction:

dimerized fatty acids with an acid number $I_A$ of between 190 and 200 mg KOH/g, included to a proportion of at least 92% weight/weight (preferably at least 95%) in a composition (A2-1-1); with a stoichiometric excess dimerized fatty alcohols with a hydroxyl number $I_{OH}$ of between 200 and 220 mg KOH/g, included to a proportion of at least 92% (preferably at least 95%) in a composition (A2-1-2).

The dimerized fatty acids of composition (A2-1-1) are also known to those skilled in the art under the name "dimerized fatty acids" or "fatty acid dimers". The said acids denote the products of dimerization of monounsaturated or polyunsaturated fatty acids comprising from one to three double bonds and/or the corresponding esters.

The preferred dimerized fatty acids are obtained from C6 to C22, preferably C10 to C22 and more particularly C14 to C22 fatty acids rich in unsaturated C18 alkyl chains.

Examples that may be mentioned include the products of dimerization:

of oleic acid, linoleic acid, linolenic acid, palmitoleic acid or elaidic acid;

of mixtures of unsaturated fatty acids obtained by hydrolysis of fats and of natural oils such as sunflower oil, soybean oil, olive oil, rapeseed oil, linseed oil, palm oil, cottonseed oil, jojoba oil, corn oil, pine oil, grapeseed oil and tall oil which is a by-product of the manufacture of paper pulp;

and also the corresponding saturated dimerized fatty acids, obtained by hydrogenation using a nickel catalyst.

These unsaturated fatty acids are extracted from these natural products, for example in methyl ester form by transesterification with methanol of the corresponding triglycerides, followed by saponification of the corresponding methyl esters.

The unsaturated fatty acids thus obtained as a mixture are then oligomerized by heating via a condensation reaction on the double bonds, which leads to the formation of technical mixtures containing about 25% of monocarboxylic acids (acid monomers) often isomerized relative to the starting acids, 70% of dicarboxylic acids (acid dimers) with twice the number of carbons relative to the starting acids, and 5% of tricarboxylic acids (acid trimers) having three times the number of carbons relative to the starting acids. By purification of this mixture, the various commercial grades of acid dimers, monomers or trimers are obtained, which may exist in hydrogenated or non-hydrogenated form.

The fatty acid dimers are isolated by distillation of the latter mixtures, to form dimers bearing two carboxylic functions (dicarboxylic acids) present in a proportion of at least 92% weight/weight in a composition that may be used as composition (A2-1-1) for the preparation of the polyester diols of the first step of the process for obtaining composition (A2).

The following formulae are given as illustrations of a few dimerized fatty acids:

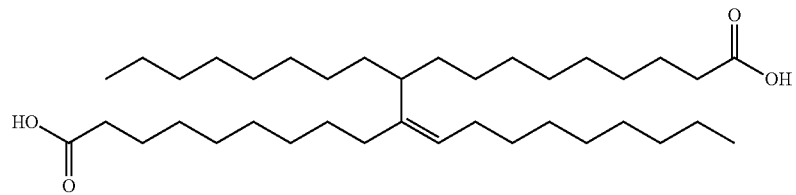

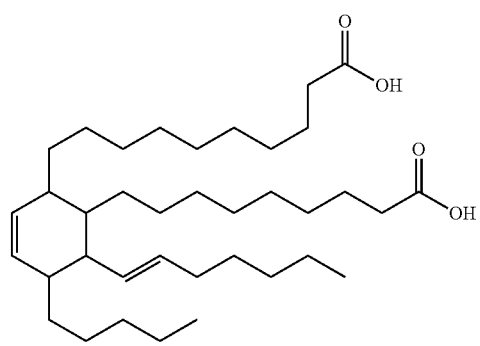

-continued

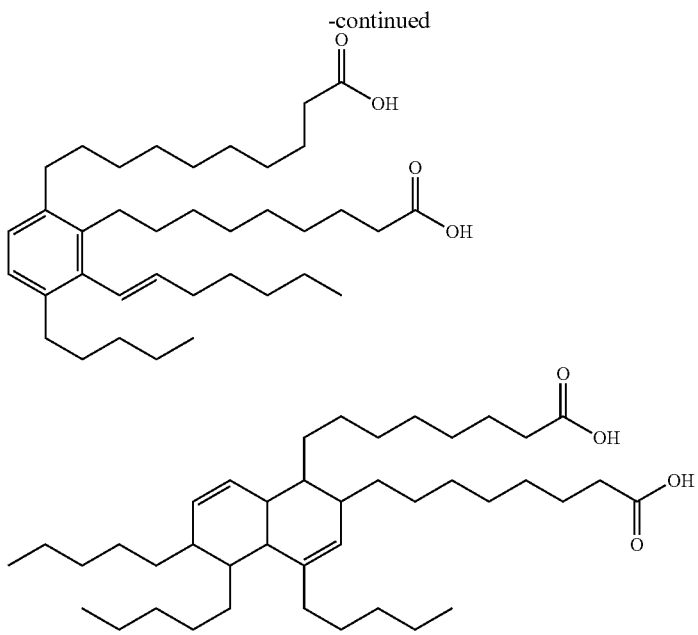

Numerous compositions of such dimerized fatty acids are commercially available, among which mention may be made of the products of the Pripol® range, distributed by the company Croda, and especially Pripol® 1013 which is a composition comprising from 95% to 98% of dimerized fatty acids with an acid number $I_A$ of between 194 and 198 mg KOH/g.

The meaning of $R^{12}$ corresponding to a dimerized fatty acid whose acid number $I_A$ is within this range is most particularly preferred.

The acid number $I_A$ is the number of carboxylic functions per gram of dimerized fatty acids of (A2-1-1), the said number being expressed in the form of an equivalent of milligrams of KOH necessary to neutralize the acidity of 1 gram of fatty substance, determined by titrimetry. The said number is linked to the number-average molar mass M by the relationship:

$$I_A = 56.1 \times 2000/M$$

The dimerized fatty alcohols with an $I_{OH}$ of between 200 and 220 mg KOH/g are obtained by catalytic hydrogenation of the fatty acid dimers in methyl diester form that have been described previously. This hydrogenation leads to the reduction of the two ester functions to two —OH functions. These dimerized fatty alcohols are thus obtained in the form of a composition in which they constitute at least 92% by weight (preferably at least 95%), and which may be used as composition (A2-1-2) for performing this first step. Compositions of such dimerized fatty alcohols are also commercially available, for instance Pripol® 2033 which is a composition comprising at least 96% of aliphatic dimerized fatty alcohols with an $I_{OH}$ number of between 202 and 212 mg KOH/g.

The meaning of $R^{11}$ corresponding to a dimerized fatty alcohol whose hydroxyl number $I_{OH}$ is within this range is most particularly preferred.

The hydroxyl number $I_{OH}$ is the number of hydroxyl functions per gram of dimerized fatty alcohols of (A2-1-2), the said number being expressed in the form of the equivalent in milligrams of KOH used in the assay of the hydroxyl functions, determined by titrimetry.

The said number is linked to the number-average molar mass M via the relationship:

$$I_{OH} = 56.1 \times 2000/M$$

In this first step for preparing composition (A2-1) of polyester diols, the dimerized fatty acids of composition (A2-1-1) are reacted with a stoichiometric excess of the dimerized fatty alcohols of composition (A2-1-2). This means that the weight amounts of the two compositions used correspond to an excess of the equivalent number of —OH functions present in (A2-1-2) relative to the equivalent number of —COOH groups present in (A2-1-1).

Preferably, these amounts correspond to an —OH/—COOH equivalent ratio of between 1.46 and 1.86. The said ratio is defined as being equal to the equivalent number of —OH functions present in (A2-1-2), divided by the equivalent number of —COOH functions present in (A2-1-1). The weight amounts of the reagents (A2-1-1) and (A2-1-2) to be placed into the reactor are determined on the basis of this ratio, and also, for the dimerized fatty acids of (A2-1-1), on their acid number, and, for the dimerized fatty alcohols of (A2-1-2), on their hydroxyl number $I_{OH}$.

The unreacted dimerized fatty alcohols are, where appropriate, removed by distillation, and a composition (A2-1) with a hydroxyl number between 40 and 60 mg KOH/g and comprising at least 85% weight/weight and preferably at least 90% weight/weight of polyester diols of formula (IV) is thus obtained.

Certain polyester diol compositions corresponding to the definition of composition (A2-1) are also commercially available, for instance Priplast® 1838 from the company Croda, the hydroxyl number $I_{OH}$ of which is equal to 55.

According to a preferred variant of the invention, the hydroxyl number $I_{OH}$ of the polyester diol of formula (IV) corresponding to the divalent polyester block $R^{10}$ varies within a range from 45 to 55 mg KOH/g.

2nd Step

Preparation of a Composition (A2-2) Comprising at Least 85% Weight/Weight of Polyurethanes Bearing Hydroxyl End Groups Composition (A2-1-1) comprising the polyester diols obtained previously is treated with the diisocyanate of formula (V):

$$NCO-R^6-NCO \quad (V)$$

in amounts corresponding to a ratio of the molar equivalent of the number of NCO/OH functions of between 0.3 and 0.7 and preferably equal to about 0.5;
so as to obtain the polyurethanes bearing hydroxyl end groups of formula (VI):

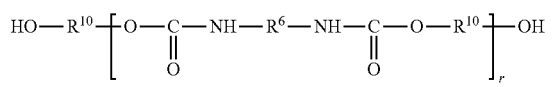

in which, preferably, r is less than or equal to 10.

However, after this second step, unreacted polyester diols of formula (IV) also remain, such that composition (A2-2) also comprises a residual amount of the said polyester diols.

The polyurethanes bearing hydroxyl end groups of formula (VI) are included in composition (A2-2) in a proportion of at least 85% weight/weight and preferably at least 90% weight-weight.

According to a preferred variant, the radical $R^6$ is chosen from one of the following divalent radicals, of which the formulae below reveal the two free valencies:

a) the divalent radical derived from isophorone:

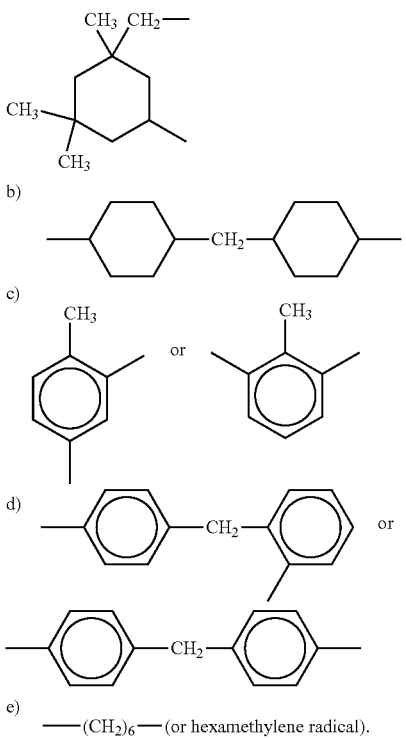

—(CH$_2$)$_6$— (or hexamethylene radical).

According to a most particularly preferred variant, $R^6$ is the divalent radical derived from isophorone:

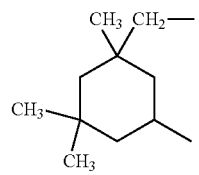

3rd Step

Production of Composition (A2) Comprising at Least 85% Weight/Weight of Polyurethanes Bearing Alkoxysilane End Groups of Formula (II)

The composition of polyurethanes bearing hydroxyl end groups (A2-2) obtained in the 2$^{nd}$ step is treated with the isocyanatosilane of formula (VII):

$$NCO-R^7-Si(R^8)_q(OR^9)_{3-q} \quad (VII)$$

in an amount corresponding to a ratio of the molar equivalent of the number of NCO/OH functions of between 0.90 and 1.05 and preferably equal to about 1.

The polyurethanes bearing alkoxysilane end groups of formula (II) included in a proportion of at least 85% weight/weight in composition (A2) and preferably in a proportion of at least 90% weight/weight are thus obtained. According to a preferred variant, in formula (II), r is less than or equal to 10.

According to another preferred variant:
$R^7$ is the methylene or n-propylene divalent radical;
$R^8$ and $R^9$ each represent a methyl or ethyl radical; and/or
q equals 0 or 1.

According to an even more preferred variant:
$R^7$ is the n-propylene radical, and
the group —Si$(R^8)_q(OR^9)_{3-q}$ is the trimethoxysilyl radical.

These preferred variants are obtained by using the isocyanatosilane having the appropriate formula (VII).

The second and third steps of the process that have just been described are performed under anhydrous conditions, so as to avoid hydrolysis of the alkoxysilane groups. A typical temperature range for performing these reaction steps is from 30° C. to 120° C. and more particularly from 60° C. to 105° C. The second step of the process is advantageously performed in the presence of an organometallic catalyst.

According to a preferred variant of the adhesive composition according to the invention, composition (A) consists of from 10% to 30% weight/weight of polymer (A1) of formula (I) and from 70% to 90% weight/weight of composition (A2) comprising the polymers bearing hydrolysable alkoxysilane end groups of formula (II).

2. Compatible Tackifying Resin (B):

As regards the tackifying resin(s) (B) that are included in the composition according to the invention, the term "compatible tackifying resin" is intended to denote a tackifying resin which, when mixed in 50%/50% proportions with composition (A), gives a substantially homogeneous mixture.

The resins (B) are advantageously chosen from:
(i) the resins obtained by polymerization of terpene hydrocarbons and of phenols, in the presence of Friedel-Crafts catalysts;
(ii) the resins obtained via a process comprising the polymerization of α-methylstyrene, the said process also possibly comprising a reaction with phenols;
(iii) rosins of natural or modified origin (for instance rosin extracted from pine gum, wood rosin extracted from tree roots) and hydrogenated, dimerized or polymerized derivatives thereof or derivatives esterified with monoalcohols or of polyols (such as glycerol);
(iv) the resins obtained by hydrogenation, polymerization or copolymerization (with an aromatic hydrocarbon) of mixtures of unsaturated aliphatic hydrocarbons containing about 5, 9 or 10 carbon atoms derived from petroleum fractions;
(v) terpenic resins, generally resulting from the polymerization of terpenic hydrocarbons, for instance monoterpene (or pinene) in the presence of Friedel-Crafts catalysts;
(vi) copolymers based on natural terpenes, for example styrene/terpene, α-methylstyrene/terpene and vinyltoluene/terpene; or
(vii) acrylic resins with a viscosity at 100° C. of less than 100 Pa·s.

According to a particularly preferred variant of the adhesive composition according to the invention, a resin of type (iii) or of type (v) is used as resin (B). An example of a commercially available resin of type (iii) that may be given is Dertoline® G2L from the company DRT, which is a rosin esterified with glycerol.

3. Crosslinking Catalyst (C):

The crosslinking catalyst (C) that may be used in the composition according to the invention may be any catalyst known to a person skilled in the art for silanol condensation. Examples of such catalysts that may be mentioned include organotitanium derivatives such as titanium acetylacetonate (commercially available under the name Tyzor® AA75 from the company DuPont), organoaluminium derivatives such as aluminium chelate (commercially available under the name K-Kat® 5218 from the company King Industries) and amines such as 1,8-diazobicyclo(5.4.0)undec-7-ene or DBU.

The hot-curable adhesive composition according to the invention preferably comprises:
(α) from 50% to 55% weight/weight of composition (A) of polymers bearing hydrolysable alkoxysilane end groups,
(β) from 43% to 48% weight/weight of tackifying resin (B), and
(γ) from 0.45% to 2.5% weight/weight of crosslinking catalyst (C).

4. Other Ingredients of the Composition According to the Invention:

Optionally, the composition according to the invention may also include thermoplastic polymers often used in the preparation of HMPSAs, such as ethylene-vinyl acetate (EVA) or styrene block copolymers.

The hot-curable adhesive composition according to the invention may also comprise up to 3% of a hydrolysable alkoxysilane derivative, as desiccant, and preferably a trimethoxysilane derivative. Such an agent advantageously prolongs the shelf life of the composition according to the invention during storage and transportation thereof, before its use. An example that may be mentioned is gamma-methacryloxypropyltrimethoxysilane sold under the trade name Silquest® A-174 from the company US Momentive Performance Materials Inc.

The composition according to the invention may also include a plasticizer such as a phthalate or a benzoate, a paraffinic and naphthenic oil (such as Primol® 352 from the company Esso) or a wax of a polyethylene homopolymer (such as A-C® 617 from Honeywell), or a wax of a copolymer of polyethylene and of vinyl acetate, or alternatively pigments, dyes or fillers.

Finally, an amount of from 0.1% to 2% of one or more stabilizers (or antioxidants) is preferably included in the composition according to the invention. These compounds are introduced to protect the composition from degradation resulting from a reaction with oxygen that is liable to be formed by the action of heat or light. These compounds may include antioxidants that trap free radicals, for instance Irganox® 245 and Irganox® 1010. These antioxidants may be used alone or in combination with other antioxidants or UV stabilizers.

5. Preparation of the Composition According to the Invention:

The heat-curable adhesive composition according to the invention may be prepared via a process which comprises:
a step of mixing protected from air, preferably under an inert atmosphere, the composition (A2) of polymers of formula (II) with the polymer (A1) of formula (I) and with the tackifying resin(s) (B), at a temperature of between 50 and 170° C. and preferably between 100 and 170° C., and then
a step of cooling the said mixture to a temperature ranging from 50 to 90° C. and advantageously about 70° C., and then
a step of incorporating into the said mixture catalyst (C) and, where appropriate, the desiccant and the other optional components.

A composition whose Brookfield viscosity, measured at 100° C., is between 10 and 100 Pa·s, making it suitable for coating onto a support layer, is thus advantageously obtained. The said viscosity is measured, according to standard DIN ISO 2555, with a Brookfield RTV viscometer equipped with a Thermosel system for high-temperature viscosity measurements, equipped with an A27 needle rotating at a speed suited to the sensitivity of the sensor (on average 10 rpm).

A subject of the present invention is also a self-adhesive support that may be obtained via the process comprising:
(a) preheating to a temperature of between 50 and 130° C. of the adhesive composition as defined previously, and then
(b) coating it on a support layer, and then
(c) curing it, by heating the support thus coated to a temperature of between 50 and 150° C.

Step (b) of coating the support layer is performed using known coating devices, for instance a lip nozzle or a nozzle of curtain type, or alternatively a roller. It uses a basis weight of adhesive composition ranging from 3 to 500 g/m$^2$ and preferably from 10 to 250 g/m$^2$. The material that may be used for the support layer is, for example, paper or a film of a polymer material with one or more layers.

The time required for the curing of step (c) may vary within wide ranges, for example between 1 second and 10 minutes, depending on the basis weight of the adhesive composition deposited on the support layer, the heating temperature and the relative humidity.

This thermal curing step has the effect of creating— between the polymer chains bearing hydrolysable alkoxysilane end groups of composition (A) and under the action of atmospheric moisture—bonds of siloxane type which lead to the formation of a three-dimensional polymer network. The adhesive composition thus cured is a pressure-sensitive adhesive which gives the support layer that is coated therewith the desirable adhesive power and tack power.

Thus, a polyethylene terephthalate (PET) support 50 μm thick, coated with a basis weight of 50 g/m², shows permanent adhesion to a stainless-steel substrate corresponding to an adhesive power (measured via the peel test at 180° C. on stainless steel described below) advantageously between 1 and 10 N/cm. The tack of this same support at room temperature (measured via the instantaneous adhesion test of the loop described below) is advantageously between 1 and 10 N/cm².

Finally, the adhesive seal formed after application to a substrate of the support layer coated with the cured composition ensures the fixing of the said support layer within a temperature range from −60° C. to +200° C.

The self-adhesive support according to the invention may also comprise a protective non-stick layer covering the layer of PSA and applied (or laminated) thereon by simple pressure.

The present invention also relates to the use of the self-adhesive support defined previously for the manufacture of one-sided or two-sided self-adhesive labels and/or tapes.

The basis weight of heat-curable adhesive composition necessary for the manufacture of self-adhesive labels may range from 10 to 100 g/m² and preferably from 20 to 50 g/m². The basis weight necessary for the manufacture of self-adhesive tapes may vary within a much wider range from 3 to 500 g/m² and preferably from 15 to 250 g/m² per face.

The examples that follow are given for purely illustrative purposes of the invention and cannot be interpreted as limiting the scope thereof.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 13 60358, filed Oct. 24, 2013 are incorporated by reference herein.

EXAMPLE A (REFERENCE)

Preparation of a Composition (A) Comprising at Least 90% Weight/Weight of Polymers Bearing Hydrolysable Alkoxysilane End Groups of Formula (II), Obtained from Pripol® 1013 and from Pripol® 2033

1st Step

Preparation of a Composition (A2-1) with a Hydroxyl Number $I_{OH}$ Equal to 45 mg KOH/g and Comprising at Least 90% Weight/Weight of Polyester Diols of Formula (IV)

542 g (1.00 mol) of dimeric fatty alcohol Pripol® 2033 with an $I_{OH}$ of 207 mg KOH/g, 369 g (0.64 mol) of dimeric fatty acid Pripol® 1013 with an acid number of 196 mg KOH/g and 1.5 g of a 50/50 weight mixture of hypophosphorous acid and methanesulfonic acid (0.2% by weight of the mixture of reagents) are placed in a jacketed 1-liter reactor and heated at 90° C. for 30 minutes while sparging gently with nitrogen. The reaction medium is then brought to 180° C. under cover of nitrogen, with mechanical stirring and under a partial vacuum of 10 mbar to remove the water generated. The condensation reaction is continued for about 6 hours until an acid number of less than 0.1 mg KOH/g is obtained.

Once the reaction is complete, the reaction medium is cooled to about 85° C. and the medium is filtered.

881 g of a composition with a hydroxyl number $I_{OH}$ equal to 45 mg KOH/g and comprising at least 90% weight/weight of polyester diols are obtained. This composition is obtained from starting materials of renewable origin to a proportion of 100% weight/weight.

2nd Step

Preparation of a Composition (A2-2) Comprising at Least 90% Weight/Weight of Polyurethanes Bearing Hydroxyl End Groups of Formula (VI)

176.9 g of the composition obtained in the first step (containing a total equivalent number of —OH functions equal to 142 mmol) are placed in a closed 250 ml reactor equipped with a stirrer, heating means and a thermometer, and connected to a vacuum pump. The system is heated to 85° C. and maintained at a reduced pressure of 20 mbar for 1 hour to dehydrate the polyester polyols.

The following are then introduced into the reactor maintained at atmospheric pressure and brought to a temperature of 90° C.:
- 20 mg of a bismuth/zinc carboxylate catalyst (Borchi® Kat VP0244 from the company Borchers GmbH), and
- 7.9 g of isophorone diisocyanate (or IPDI, with a titre of 37.6% weight/weight of —NCO groups), containing 71 mmol of —NCO functions.

The amounts introduced thus correspond to an NCO/OH mole ratio equal to 0.5.

The polyaddition reaction is continued for 3 hours until consumption of the —NCO functions of the isophorone diisocyanate is complete (detected by the disappearance of the —NCO band on infrared analysis).

184.8 g of a composition (A2-2) with a content of —OH functions of 0.384 mmol/g and comprising at least 90% of polyurethanes bearing hydroxyl end groups are obtained.

3rd Step

Production of Composition (A2) Comprising at Least 90% Weight/Weight of Polyurethanes Bearing Hydrolysable Alkoxysilane End Groups of Formula (II)

15.0 g of gamma-isocyanato-n-propyltrimethoxysilane (with a titre of 19.9% weight/weight of —NCO groups), i.e. 70.98 mmol of NCO corresponding to an NCO/OH ratio equal to 1, are placed in the reactor of the second step.

The reactor is then maintained under an inert atmosphere at 100° C. for 1.5 hours until reaction is complete (detected by the disappearance of the —NCO band on infrared analysis).

200.0 g of a composition that is viscous at room temperature, with a viscosity at 100° C. of 8450 mPa·s (measured with a Brookfield viscometer at 100° C. with a No. 27 needle rotating at a rate of 20 rpm) comprising at least 90% weight/weight of polyurethanes bearing hydrolysable alkoxysilane end groups of formula (II) are obtained.

The weight proportion of this composition that is obtained from renewable starting materials corresponds to the weight of composition (A2-1) of polyester diols, i.e. 88.5% weight/weight.

EXAMPLE B (REFERENCE)

Preparation of a Composition (A2) Comprising at Least 85% Weight/Weight of Polyurethanes Bearing Hydrolysable Alkoxysilane End Groups of Formula (II), Obtained from Priplast® 1838

The 2nd step of Example A is repeated, introducing into the closed 250 ml reactor 86.34 g of the commercial polyester diol composition Priplast® 1838 (whose hydroxyl number $I_{OH}$ is equal to 55 mg KOH/g), and adjusting the weight amount of IPDI so as to keep the NCO/OH ratio equal to 0.5. Priplast® 1838 is obtained at 100% weight/weight from starting materials of renewable origin.

The third step of Example A is also repeated, adjusting the weight amount of gamma-isocyanato-n-propyltrimethoxysilane so as to keep the NCO/OH ratio equal to 1.

A composition that is viscous at room temperature, whose viscosity at 100° C. is 3180 mPa·s (measured with a Brookfield viscometer at 100° C., with a No. 27 needle rotating at a rate of 20 rpm) is obtained.

This composition comprises at least 85% weight/weight of polyurethanes bearing hydrolysable alkoxysilane end groups of formula (II).

The weight proportion of this composition that is obtained from renewable starting materials corresponds to the weight of the polyester diol composition (A2-1), i.e. 86.3% weight/weight.

EXAMPLE 1

According to the Invention

1) Preparation of a heat-curable adhesive composition, based on the composition of polymers bearing hydrolysable alkoxysilane end groups of Example A:

Geniosil® STP-E30, available from the company Wacker, is used in this example as polymer (A1) of formula (I). This polymer is a polyether of formula (I) in which m equals 0, p equals 1, $R^4$ and $R^5$ represent a methyl radical, $R^3$ is a methylene radical and $R^2$ is an isopropylene radical. This polyether has a viscosity (measured at 23° C.) of 30 Pa·s and a number-average molecular mass of 38 kDa.

The composition featured in the table below is prepared by first placing the tackifying resin Dertoline® G2L in a glass reactor under vacuum, with stirring and heated to about 130° C. Next, once the resin has completely melted, composition (A2) of Example A is added.

The mixture is stirred under vacuum for 45 minutes and then cooled to 100° C. The Geniosil® STP-E30 is then added. The mixture is stirred under vacuum for 20 minutes and then cooled to 80° C. The desiccant (Silquest A-174) and the catalyst (K-KAT® 5218) are then added at the same time as the antioxidants Irganox® 245 and Irganox® 1010. The mixture is maintained under vacuum and with stirring for a further 10 minutes.

The Brookfield viscosity of the composition thus obtained is indicated in the table.

The weight proportion of this composition that is obtained from renewable starting materials is calculated from:
the weight proportion of the composition of Example A that is obtained from renewable starting materials (i.e. 88.5%), weighted by the content of the said composition in the composition of the present example (i.e. 39.12%) and from
the content in the composition of the present example of Dertoline G2L (i.e. 46.51%), which is itself 100% of renewable origin.

This weight proportion is 80.7% weight/weight.

2) Preparation of a PET support layer coated with the crosslinked composition, at a basis weight rate equal to 50 g/m²:

A polyethylene terephthalate (PET) rectangular sheet 50 μm thick and 20 cm by 40 cm in size is used as support layer.

The composition obtained in 1) is preheated to a temperature close to 100° C. and is placed in a cartridge, from which a bead is extruded which is deposited close to the edge of the sheet parallel to its width.

The composition contained in this bead is then spread over the entire surface of the sheet, so as to obtain a uniform layer of substantially constant thickness. A film spreader (also known as a filmograph) is used to do this, which is moved from the edge of the sheet to the opposite edge. A layer of composition corresponding to a basis weight of 50 g/m² is thus deposited, which represents a thickness of about 50 μm.

The PET sheet thus coated is then placed in an oven at 120° C. for 8 minutes for crosslinking of the composition, and is then laminated onto a protective non-stick layer consisting of a rectangular sheet of silicone film of the same dimensions.

The PET support layer thus obtained is subjected to the tests described below.

Peel Test at 180° on a Stainless-Steel Plate:

The adhesive power is evaluated by the peel test at 180° on a stainless-steel plate as described in FINAT method No. 1, published in the FINAT 6th edition Technical Manual, 2001. FINAT is the international federation of self-adhesive label manufacturers and transformers. The principle of this test is as follows.

A specimen in the form of a rectangular strip (25 mm×175 mm) is cut out of the PET support layer coated with the crosslinked composition obtained previously. This specimen is fixed over ⅔ of its length (after removal of the corresponding portion of the protective non-stick layer) to a substrate consisting of a stainless-steel plate. The assembly obtained is left for 20 minutes at room temperature. It is then placed in a traction machine that is capable, starting from the free end of the rectangular strip, of peeling or detaching the strip at an angle of 180° and with a separation rate of 300 mm per minute. The machine measures the force required to detach the strip under these conditions.

The corresponding result is expressed in N/cm and indicated in the following table.

Instantaneous Adhesion Test (Also Known as the Loop Test):

The immediate bonding power or tack is evaluated by the instantaneous adhesion test known as the loop test, described in FINAT method No. 9, the principle of which is as follows.

A specimen in the form of a rectangular strip (25 mm×175 mm) is cut out of the PET support layer coated with the crosslinked composition obtained previously. After removing all of the protective non-stick layer, the two ends of this strip are attached so as to form a loop whose adhesive layer is facing outwards. The two attached ends are placed in the movable jaw of a traction machine capable of imposing a rate of movement of 300 mm/minute along a vertical axis with possibility of travelling to and fro. The lower part of the loop placed in the vertical position is first placed in contact with a horizontal glass plate 25 mm×30 mm on a square zone with a side length of about 25 mm. Once this contact is established, the direction of movement of the jaw is reversed. The immediate bonding power is the maximum value of the force required for the loop to become fully detached from the plate.

The corresponding result is expressed in N/cm² and indicated in the following table.

Resistance Time of the Adhesive Seal to Static Shear at 90° C.:

The maintenance at elevated temperature of the adhesive power of the PET support layer obtained previously in 2) is evaluated via a test which determines the resistance time of the adhesive seal to static shear at 90° C. Reference is made for this test to FINAT method No. 8. The principle is as follows.

A specimen in the form of a rectangular strip (25 mm×75 mm) is cut out of each of the previous two PET support layers. After removing all of the protective non-stick layer, a square portion with a side length of 25 mm located at the end of the adhesive strip is fixed onto a glass plate.

The test plate thus obtained is introduced, by means of a suitable support, in a substantially vertical position into an oven at 90° C., the unattached part of the strip 50 mm long being below the plate. After thermal equilibration, the free part of the strip is connected to a 1 kg mass, the whole device still remaining throughout the duration of the test in the oven at 90° C.

Due to the effect of this mass, the adhesive seal that fixes the strip to the plate is subjected to a shear stress. To better control this stress, the test plate is in fact placed so as to make an angle of 2° relative to the vertical. The time after which the strip detaches from the plate following rupture of the adhesive seal under the effect of this stress is noted.

This time is indicated in the following table.

EXAMPLES 2 AND 3 (ACCORDING TO THE INVENTION) AND 4-7 (COMPARATIVE)

Example 1 is repeated with the compositions indicated in the following table.

The results obtained are also indicated in the table.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

| | | % weight/weight content | | | | | | |
|---|---|---|---|---|---|---|---|---|
| Ingredient | | Example 1 | Example 2 | Example 3 | Example 4 (comp.) | Example 5 (comp.) | Example 6 (comp.) | Example 7 (comp.) |
| Composition (A) | Content of Geniosil ® STP-E30 (A1) | 25.4 | 15.0 | 25.4 | 25.0 | 5.1 | 25.0 | 0 |
| | Nature of (A2) | Example A | Example A | Example B | Example A | Example A | Example A | Example B |
| | Content of (A2) | 74.6 | 85.0 | 74.6 | 75.0 | 94.9 | 75.0 | 100 |
| (α) Composition (A) | | 51.76 | 53.01 | 51.76 | 41.92 | 51.56 | 61.97 | 51.12 |
| (β) Dertoline ® G2L | | 46.51 | 45.26 | 46.51 | 56.35 | 46.71 | 36.30 | 46.15 |
| (γ) K-KAT ® 5218 | | 0.50 | 0.50 | 0.50 | 0.50 | 0.50 | 0.50 | 2.00 |
| Irganox ® 245 + Irganox ® 1010 | | 0.73 | 0.73 | 0.73 | 0.73 | 0.73 | 0.73 | 0.73 |
| Silquest ® A-174 | | 0.50 | 0.50 | 0.50 | 0.50 | 0.50 | 0.50 | 0.50 |
| Brookfield viscosity at 100° C. (Pa · s) | | 11.4 | 24.5 | 73.9 | 13.5 | 26 | 12.3 | 13.4 |
| Weight proportion of renewable origin (% weight/weight) | | 81 | 85 | 80 | 84 | 90 | 77 | 90 |
| Peel at 180° (N/cm) | | 7.4 | 6.7 | 3.5 | 1.2 | 6.3 | 0.8 | 7.0 |
| Instantaneous adhesion (N/cm²) | | 4.1 | 5.3 | 2.1 | 1.7 | 1.9 | 1.1 | 2.8 |
| Resistance time of the bonding seal to static shear at 90° C. | | >24 hours | >24 hours | >24 hours | <1 h 15 min | <47 mm | <48 min | <25 min |

The invention claimed is:

1. A heat-curable adhesive composition comprising:
(α) from 47% to 60% weight/weight of a composition (A) comprising polymers bearing hydrolyzable alkoxysilane end groups which composition (A) is:
from 10% to 50% weight/weight of a polymer (A1) of formula (I):

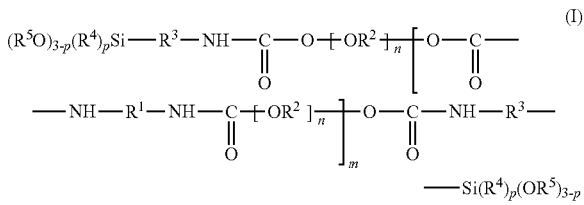

in which:
R¹ represents a divalent hydrocarbon-based radical comprising from 5 to 15 carbon atoms, which may be aromatic or aliphatic, and linear, branched or cyclic;
R² represents a linear or branched divalent alkylene radical comprising from 1 to 4 carbon atoms;
R³ represents a linear divalent alkylene radical comprising from 1 to 3 carbon atoms;
R⁴ and R⁵, which may be identical or different, each represent a linear or branched alkyl radical of 1 to 4 carbon atoms;
n is an integer such that the number-average molar mass of the polyether block of formula —[OR²]ₙ— is between 300 Da and 30 kDa;
m is either equal to 0 or a non-zero integer such that the number-average molar mass of the polymer of formula (I) is between 600 Da and 60 kDa;

p is an integer equal to 0, 1 or 2; and from 50% to 90% weight/weight of a composition (A2) comprising at least 85% weight/weight of polyurethanes bearing hydrolysable alkoxysilane end groups of formula (II):

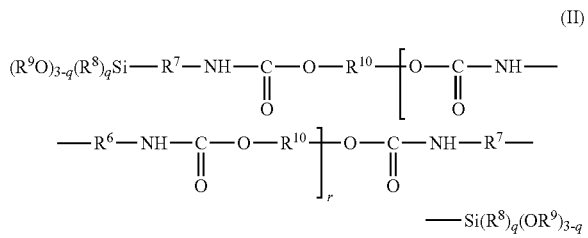

in which:

$R^6$ represents a divalent hydrocarbon-based radical comprising from 5 to 15 carbon atoms, which may be aromatic or aliphatic, and linear, branched or cyclic;

$R^7$ represents a linear divalent alkylene radical comprising from 1 to 3 carbon atoms;

$R^8$ and $R^9$, which may be identical or different, each represent a linear or branched alkyl radical of 1 to 4 carbon atoms;

q is an integer equal to 0, 1 or 2;

r is a number such that the number-average molar mass of the polymers of formula (II) is between 900 Da and 11 kDa;

$R^{10}$ represents a divalent polyester block of formula (III):

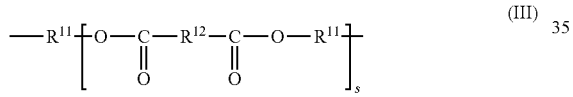

in which:

$R^{11}$ represents a divalent hydrocarbon-based radical which is derived from a dimerized fatty alcohol by replacement of each of the two hydroxyl groups with a free valency, the said alcohol having a hydroxyl number $I_{OH}$ of between 200 and 220 mg KOH/g;

$R^{12}$ represents a divalent hydrocarbon-based radical which is derived from a dimerized fatty acid by replacement of each of the two carboxyl groups —COOH with a free valency, the said acid having an acid number $I_A$ of between 190 and 200 mg KOH/g;

s is a number such that the polyester diol of formula IV:

has a hydroxyl number $I_{OH}$ of between 40 and 60 mg KOH/g;

(β) from 37% to 50% weight/weight of a compatible tackifying resin (B) with a number-average molar mass of between 200 Da and 10 kDa; and (γ) from 0.01% to 3% weight/weight of a crosslinking catalyst (C).

2. The heat-curable adhesive composition according to claim 1, wherein polymer (A1) is a polyether, corresponding to formula (I) in which m equals 0.

3. The heat-curable adhesive composition according to claim 1, wherein in polymer (A1):

$R^4$ and $R^5$, which may be identical or different, each represent a methyl or ethyl radical;

$R^2$ is ethylene, isopropylene, n-propylene, n-butylene, or ethylethylene.

4. The heat-curable adhesive composition according to claim 1, wherein in the polymers of formula (II) the hydroxyl number $I_{OH}$ of the polyester diol of formula (IV) corresponding to the divalent polyester radical $R^{10}$ varies within a range from 45 to 55 mg KOH/g.

5. The heat-curable adhesive composition according to claim 1, wherein in the polymers of formula (II) the dimerized fatty acid from which the radical $R^{12}$ is derived has an acid number $I_A$ of between 194 and 198 mg KOH/g.

6. The heat-curable adhesive composition according to claim 1, wherein in the polymers of formula (II) the dimerized fatty alcohol from which the radical $R^{11}$ is derived has a hydroxyl number $I_{OH}$ of between 202 and 212 mg KOH/g.

7. The heat-curable adhesive composition according to claim 1, wherein in the polymers of formula (II) the radical $R^6$ is one of the following divalent radicals for which the formulae below reveal the two free valencies:

a) a divalent radical derived from isophorone:

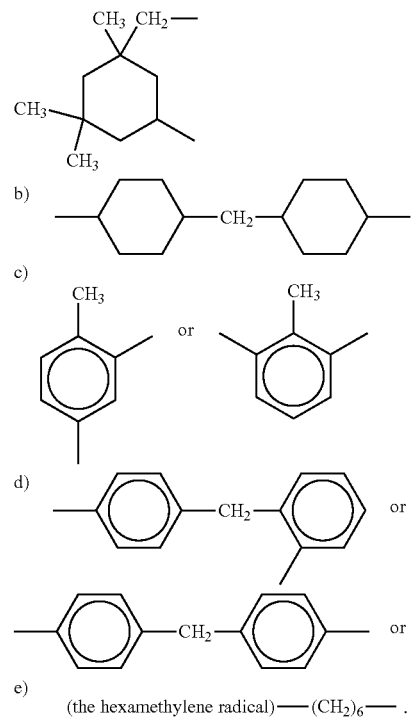

8. The heat-curable adhesive composition according to claim 1, wherein in the polymers of formula (II) the radical $R^6$ is a divalent radical derived from isophorone.

9. The heat-curable adhesive composition according to claim 1, wherein in the polymers of formula (II):

$R^7$ is a divalent methylene or n-propylene radical;

$R^8$ and $R^9$ each represent a methyl or ethyl radical; and/or q equals 0 or 1.

10. The heat-curable adhesive composition according to claim 1, wherein composition (A) is from 10% to 30% weight/weight of polymer (A1) and from 70% to 90% weight/weight of composition (A2).

11. The heat-curable adhesive composition according to claim 1, wherein the tackifying resin (B) is:

(iii) rosins of natural or modified origin, or (v) terpenic resins, resulting from the polymerization of terpenic hydrocarbons.

12. The heat-curable adhesive composition according to claim 1, comprising:
- (α) from 50% to 55% weight/weight of composition (A) of polymers bearing hydrolysable alkoxysilane end groups,
- (β) from 43% to 48% weight/weight of tackifying resin (B), and
- (γ) from 0.45% to 2.5% weight/weight of crosslinking catalyst (C).

13. The heat-curable adhesive composition according to claim 1, having a Brookfield viscosity measured at 100° C. between 10 and 100 Pa·s.

14. A self-adhesive support obtained via the process comprising:
- (a) preheating to a temperature of between 50 and 130° C. the adhesive composition as defined in claim 1, and then
- (b) coating it onto a support layer, and then
- (c) curing it, by heating the support thus coated to a temperature of between 50 and 150° C.

15. One-sided or two-sided self-adhesive labels or tapes, comprising in said labels or tapes the self-adhesive support as defined in claim 14.

16. The heat-curable adhesive composition according to claim 11, wherein the tackifying resin (B) is rosin extracted from pine gum, wood rosin extracted from tree roots or hydrogenated, dimerized or polymerized derivatives thereof or derivatives esterified with monoalcohols or polyols.

17. The heat-curable adhesive composition according to claim 16, wherein (B) is glycerol.

18. The heat-curable adhesive composition according to claim 11, wherein (B) is a terpenic resin resulting from the polymerization of monoterpene in the presence of a Friedel-Craft catalyst.

* * * * *